(12) United States Patent
Yokohata et al.

(10) Patent No.: US 8,442,696 B2
(45) Date of Patent: May 14, 2013

(54) GAS METER AND GAS SAFETY SYSTEM

(75) Inventors: Mitsuo Yokohata, Osaka (JP);
Hirozumi Nakamura, Nara (JP);
Tadanori Shirasawa, Nara (JP); Kazuo Kubo, Hyogo (JP); Mitsuo Namba, Tokyo (JP); Hisashi Saito, Tokyo (JP)

(73) Assignee: Panasonic Corporation, Osaka (JP)

( * ) Notice: Subject to any disclaimer, the term of this patent is extended or adjusted under 35 U.S.C. 154(b) by 259 days.

(21) Appl. No.: 12/921,340

(22) PCT Filed: Feb. 24, 2009

(86) PCT No.: PCT/JP2009/000813
§ 371 (c)(1),
(2), (4) Date: Sep. 7, 2010

(87) PCT Pub. No.: WO2009/110190
PCT Pub. Date: Sep. 11, 2009

(65) Prior Publication Data
US 2011/0004353 A1    Jan. 6, 2011

(30) Foreign Application Priority Data
Mar. 7, 2008 (JP) ................................. 2008-057351

(51) Int. Cl.
*G05D 11/00* (2006.01)
(52) U.S. Cl.
USPC .............. 700/282; 137/382; 604/540; 702/45
(58) Field of Classification Search .................... 702/45; 700/282; 137/382; 604/540
See application file for complete search history.

(56) References Cited

U.S. PATENT DOCUMENTS

| 4,839,790 | A | * | 6/1989 | Fujimoto et al. | ................ 700/79 |
| 4,866,633 | A | * | 9/1989 | Nakane et al. | ................ 700/282 |
| 5,126,934 | A | * | 6/1992 | MacFadyen | .................... 700/11 |
| 6,269,829 | B1 | * | 8/2001 | Chen et al. | ....................... 137/38 |

(Continued)

FOREIGN PATENT DOCUMENTS

| JP | 08-005398 A | 1/1996 |
| JP | 2000-081348 A | 3/2000 |

(Continued)

OTHER PUBLICATIONS

International Search Report for International Application No. PCT/JP2009/000813, dated Apr. 21, 2009, 1 page.

*Primary Examiner* — Mohammad Ali
*Assistant Examiner* — Anthony Whittington
(74) *Attorney, Agent, or Firm* — Brinks Hofer Gilson & Lione

(57) ABSTRACT

Setting safety function, as appropriate, according to a user environment is enabled, thereby enhancing safety function. According to selection information from a safety function selection unit 120, a function setting unit 116 sets arbitrary function among a plurality of functions as safety function pertaining to usage of a gas. When operating conditions for safety function are fulfilled, a monitoring unit 112 detects malfunction, which would arise during usage of a gas, and outputs a safety signal to a control unit 114 in accordance with the set safety function. In accordance with a safety signal from the monitoring unit 112, the control unit 114 cuts off a gas supply when an event fulfilling operating conditions for the set function has arisen. When an event fulfilling operating conditions for an unset function has arisen, a communication unit 124 reports occurrence of malfunction pertaining to unset function to the monitoring center 200.

4 Claims, 2 Drawing Sheets

U.S. PATENT DOCUMENTS

| | | | |
|---|---|---|---|
| 2003/0079774 A1* | 5/2003 | Reyman | 137/38 |
| 2003/0193404 A1* | 10/2003 | Joao | 340/825.71 |
| 2004/0128034 A1* | 7/2004 | Lenker et al. | 700/282 |
| 2006/0174707 A1* | 8/2006 | Zhang | 73/592 |
| 2006/0271242 A1* | 11/2006 | Shturman et al. | 700/282 |
| 2007/0219532 A1* | 9/2007 | Karpowicz et al. | 604/540 |
| 2008/0185049 A1* | 8/2008 | Mulligan et al. | 137/382 |

FOREIGN PATENT DOCUMENTS

| | | |
|---|---|---|
| JP | 2002-074497 A | 3/2002 |
| JP | 2002-090199 A | 3/2002 |
| JP | 2005-018720 A | 1/2005 |
| JP | 2006-242654 A | 9/2006 |

* cited by examiner

GAS METER AND GAS SAFETY SYSTEM

TECHNICAL FIELD

The present invention relates to a gas meter that measures a quantity of consumed gas and a gas safety system including the gas meter.

BACKGROUND ART

Some related-art gas meters that measure the quantity of consumed gas have a safety function for cutting off a gas supply channel, and the like, when a problem has arisen during usage of a gas. The safety functions include a function for cutting off a gas supply channel by means of a shutoff valve when, for instance, a seismoscope detects a predetermined seismic intensity level or more; or for cutting off the gas supply channel when a predetermined flow or a predetermined operating time is exceeded.

Patent Document 1 shows a gas meter control system that stops a gas supply by use of a communication line for automatic reading or a prepaid card system when a quantity of available gas is achieved, in order to supply the quantity of gas commensurate with a payment. Patent Document 2 discloses a network system that automatically reads the quantity of consumed water, electricity, gas, and the like, and that enables calculation and charging of a bill, checking of a water leak, transfer of information about detection of an electricity leak and a gas leak, and the like. Patent Document 3 discloses a gas management system that shuts off a gas supply at a point in time when remaining balance information about a gas bill has come to zero as a result of use of a prepaid card, thereby streamlining a meter reading service and a bill collection service.

Patent Document 1: JP-A-8-5398
Patent Document 2: JP-A-2005-18720
Patent Document 3: JP-A-2002-74497

Problem that the Invention is to Solve

There is a case where a required gas safety function changes according to an environment in which a gas meter and a gas appliance is to be disposed, such as a country and a district or according to the type of or the state of usage of a gas appliance used, while being connected, in a household of each user. For instance, in a country or a district having very little potential risk of occurrence of an earthquake, there is no great necessity for a cutoff function to be effected at the time of detection of a tremor. In relation to a function for cutting off a gas when a predetermined operating time has exceeded, it is preferable to change a continual operating time used for determination concerning a shutoff according to the quantity of flow consumed. It is difficult to change a fixed safety function as appropriate according to a gas appliance or the state of usage of a gas appliance used by each user.

SUMMARY OF THE INVENTION

The present invention has been conceived in view of the circumstance and aims at providing a gas meter and a gas safety system that enable setting of safety function according to a use environment, and the like, and enhancement of the safety function.

Means for Solving the Problem

A gas meter of the present invention comprises: a flow measurement unit that measures a gas flow flowing through a gas flow passage; a flow computing unit that computes predetermined flow data in accordance with a flow value measured by the flow measurement unit; a function setting unit that sets arbitrary function among a plurality of functions as safety function pertaining to usage of a gas; a monitoring unit that monitors malfunction, which would arise during usage of a gas, pursuant to the safety function including function set by the function setting unit; a control unit that performs processing pertaining to the safety function when the monitoring unit detects malfunction; and a communication unit that establishes a communication with the monitoring center that monitors a gas supply in accordance with a command from the control unit, wherein the control unit interrupts a gas supply when an event fulfilling operating conditions for the function set by the function setting unit has arisen and reports occurrence of malfunction pertaining to unset function to the monitoring center by means of the communication unit when an event fulfilling operating conditions for function not set by the function setting unit has arisen.

As a result, safety function can be set, as appropriate, according to a use environment, and a gas supply can be interrupted when an event corresponding to the set function has arisen. By virtue of unset functions being reported to the monitoring center, the monitoring center can ascertain occurrence of malfunction pertaining to unset function. In this case, for instance, the user is prompted to set corresponding safety function, thereby enhancing safety function.

The present invention also relates to the gas meter, wherein the control unit includes an element that makes a report when an event fulfilling operating conditions for the unset function has arisen a predetermined number of times at the time of notification of occurrence of malfunction related to the unset function.

As a result, the accuracy of detection of a state of occurrence of malfunction incidental to a gas supply can be enhanced.

The present invention also relates to the gas meter, wherein the function setting unit can set, as the safety function, at least any of functions for detecting malfunction due to events; namely, an excess flow, an excess in operating time, detection of leakage, anomalous pressure, detection of pulsation, operation of a seismoscope, and operation of an alarm.

As a result, it becomes possible to select safety function from among a plurality of safety functions, and detect and process malfunction including at least any of a plurality of events.

The present invention also provides a gas safety system comprising any one of the foregoing gas meters and a monitoring center that is connected to the gas meter by way of a communication line and that receives a report from the gas meter.

ADVANTAGE OF THE INVENTION

According to the present invention, there can be provided a gas meter and a gas safety system that enable appropriate setting of safety function according to a use environment, and the like, and enhancement of the safety function.

DESCRIPTION OF THE REFERENCE NUMERALS AND SYMBOLS

100 GAS METER
102 PASSAGEWAY
104 CUTOFF VALVE
106 FLOW MEASUREMENT UNIT
108 PRESSURE SENSOR
110 FLOW COMPUTING UNIT
112 MONITORING UNIT
114 CONTROL UNIT
116 FUNCTION SETTING UNIT
118 MEASUREMENT FUNCTION SELECTION UNIT
120 SAFETY FUNCTION SELECTION UNIT
122 INPUT UNIT
124 COMMUNICATION UNIT
126 SEISMOSCOPE
128 ALARM
151, 152, 153 GAS APPLIANCE
200 MONITORING CENTER
300 COMMUNICATION LINE

DETAILED DESCRIPTION OF THE PREFERRED EMBODIMENTS

Figure 1:
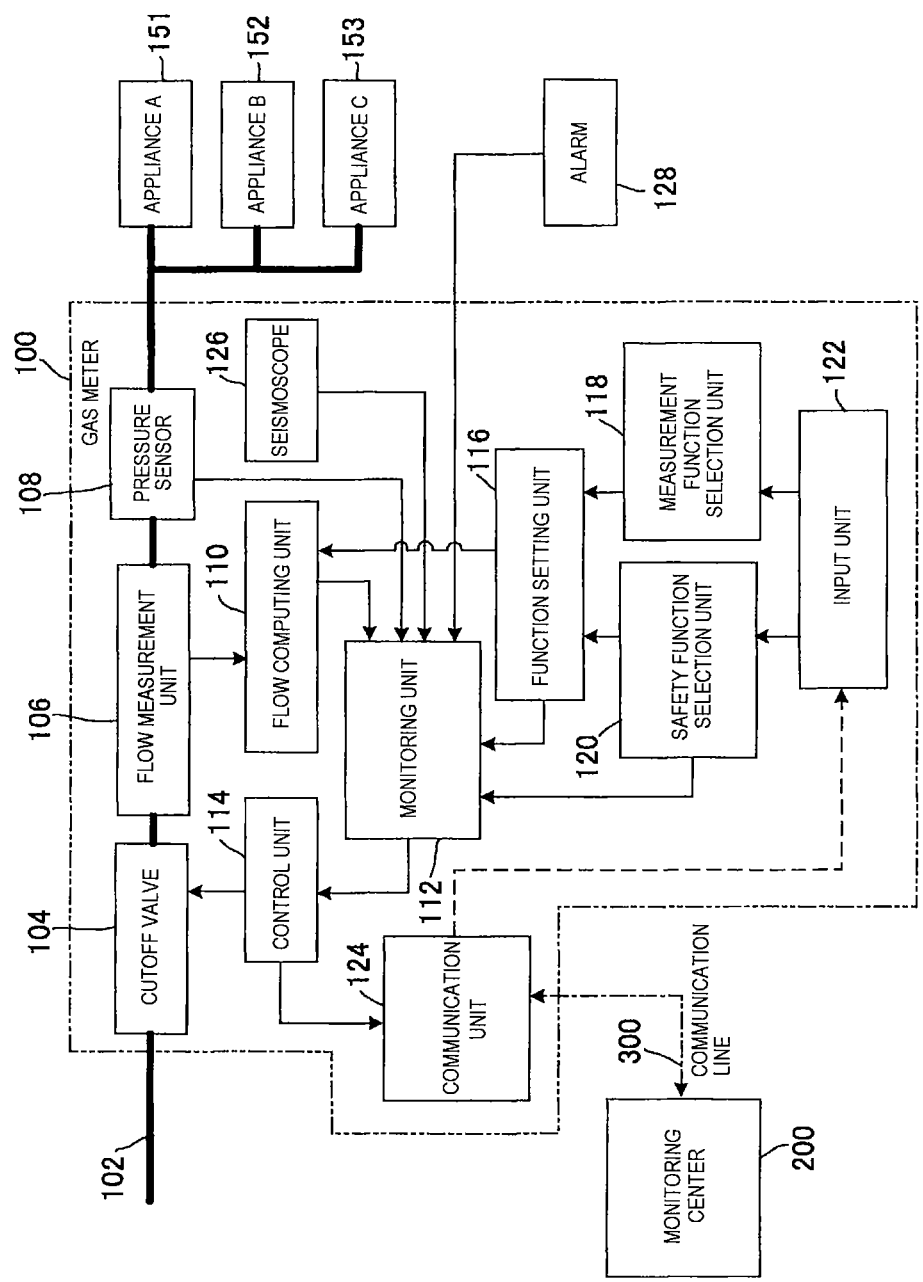
FIG. 1 is a block diagram showing the configuration of a gas meter and a gas safety system of an embodiment of the present invention.

FIG. 1 is a block diagram showing the configuration of a gas meter and a gas safety system of a first embodiment of the present invention. The gas safety system of the present embodiment is made up of a gas meter 100 serving as a flow measurement apparatus and a monitoring center 200 that performs monitoring of safety functions pertaining to a gas supply, management of operating conditions achieved in respective users, and the like. The gas meter 100 is placed outside or inside a building in which gas appliances are to be provided. The monitoring center 200 is an apparatus that is installed in a gas company, a propane gas supplier, an administrative department of an affiliate thereof, a convenience store, and the like; and that performs centralized management of the gas meter 100 disposed in each of buildings. The gas meter 100 and the monitoring center 200 are connected to each other in a communicable manner by way of a communication line 300, such as a wireless communication line, a telephone line, and the Internet, thereby enabling exchange of various signals and data between them.

The gas meter 100 is connected to a passageway 102 by way of which gas is supplied; and a cutoff valve 104, a flow measurement unit 106, and a pressure sensor 108 are provided in the passageway 102. The gas meter 100 has a flow computing unit 110, a monitoring unit 112, a control unit 114, a function setting unit 116, a measurement function selection unit 118, a safety function selection unit 120, an input unit 122, a communication unit 124, and a seismoscope 126. Functions of the flow computing unit 110, the monitoring unit 112, the control unit 114, the function setting unit 116, the measurement function selection unit 118, and the safety function selection unit 120 are implemented by an arithmetic processing unit made up of a processor, such as a microcomputer, and memory.

One or more various gas appliances A 151, B 152, and C 153, such as a gas cooker, a fan heater, a hot water supply, and a floor heater, are connected to downstream points on a passageway with respect to the gas meter 100. An alarm 128 that issues an alarm about an anomalous state upon detection of an escape of a gas, carbon monoxide (CO), and the like, is disposed in the vicinity of locations where the gas appliances 151 to 153 are installed; and is mutually communicable with the gas meter 100 by means of wireless or wired communication.

The flow measurement unit 106 measures the quantity of gas flowing through the passageway 102 and is made up of an ultrasonic flowmeter. Although an example configuration using an ultrasonic flowmeter as the flow measurement unit 106 is described in connection with the present embodiment, other various flow measurement means, such as a fluidic flowmeter and a membrane flowmeter, may also be employed, so long as the flowmeter can measure the quantity of gas. In the flow measurement unit 106, an ultrasonic transmitter and an ultrasonic receiver, which are disposed respectively at upstream and downstream positions in the passage 102, alternately exchange ultrasonic waves at a given time interval (e.g., two seconds, and the like), thereby determining a difference between a propagation time of ultrasonic waves acquired in a forward flow direction of a fluid and a propagation time of ultrasonic waves acquired in a reverse flow direction of the fluid. A flow speed of and the quantity of a fluid to be measured are measured on the basis of the propagation time difference.

The flow computing unit 110 computes the quantity of gas consumed, a flow pattern corresponding to a time for measuring the quantity, and the like, by use of a measured flow value output from the flow measurement unit 106; and stores flow data pertaining to the quantity and the time, such as an integrated flow and a flow pattern, in an internally/externally-installed storage unit. The thus-computed flow data are output to the monitoring unit 112. A flow measurement function of the flow computing unit 110 can selectively be set by the measurement function selection unit 118 and the function setting unit 116, which will be described later.

The pressure sensor 108 detects the pressure of a gas in the passageway 102 and outputs a pressure detection signal to the monitoring unit 112. The seismoscope 126 detects a tremor of an earthquake; and outputs a seismic signal to the monitoring unit 112 upon detection of a tremor of seismic intensity of a predetermined level or more. The alarm 128 detects an escape of a gas from the passageway 102 or the gas appliances 151 to 153 and CO originated from the gas appliances 151 to 153. When detecting the escape of a gas or CO, the alarm outputs an anomaly detection signal to the monitoring unit 112. The communication unit 124 has a wired or wireless communication function and establishes a communication with the monitoring center 200 by way of the communication line 300, to thus exchange a signal and data.

Pursuant to preset safety functions, the monitoring unit 112 monitors malfunction that will arise during usage of a gas. When operating conditions for the safety functions are fulfilled in accordance with the flow data from the flow computing unit 110, the pressure detection signal from the pressure sensor 108, the seismic signal from the seismoscope 126, the anomaly detection signal from the alarm 128, and the like, the monitoring unit 112 detects malfunction during usage of a gas and outputs a safety signal to the control unit 114. The safety function selection unit 120 and the function setting unit 116, which will be described later, can selectively set safety function of the monitoring unit 112. The monitoring unit 112 has first monitoring operation for monitoring the safety function set by the function setting unit 116 and second monitoring operation for monitoring safety function that is not set by the function setting unit 116.

The measurement function selection unit 118 stores information about various measurement functions implemented by the flow computing unit 110, and outputs selection information about a corresponding measurement function to the function setting unit 116 in accordance with an input command from the input unit 122. The safety function selection unit 120 stores information about various safety functions implemented by the monitoring unit 112 and outputs selection information about corresponding safety function to the function setting unit 116 in accordance with an input command from the input unit 122.

The function setting unit 116 sets measurement function and safety function of the gas meter in accordance with the pieces of selection information output from the measurement function selection unit 118 and the safety function selection unit 120 and outputs function setting signals to the flow computing unit 110 and the monitoring unit 112, respectively. There may also be adopted a configuration in which programs for implementing various measurement functions are previously stored in the flow computing unit 110 and in which a corresponding function is activated by means of a function setting signal from the function setting unit 116. Alternatively, there may also be adopted a configuration in which a program for a measurement function previously stored in and selected by the measurement function selection unit 118 is read and input to the flow computing unit 110 from the function setting unit 116, to thus be caused to run. Alternatively, there may also be adopted a configuration in which programs for implementing various safety functions are previously stored in the monitoring unit 112 and in which a corresponding function is performed by means of a function setting signal from the function setting unit 116. Alternatively, there may also be adopted a configuration in which a program for safety function previously stored in and selected by the safety function selection unit 120 is read and input to the monitoring unit 112 from the function setting unit 116, to thus be caused to run.

The input unit 122 has an interface function of inputting a command for selecting measurement function to the measurement function selection unit 118 and a command for selecting safety function to the safety function selection unit 120. The input unit 122 can input the selection signal transmitted from the monitoring center 200 by way of the communication line 300 and the communication unit 124 to the measurement function selection unit 118 and the safety function selection unit 120. The input unit can also input a selection command by various communication means, such as wireless communication and infrared communication as well as by a remote command from the monitoring center 200. The input unit 122 can also be configured so as to have an operation button, a user's indicator, information processing equipment such as a personal computer, and operation input means such as a terminal and to enable a user or a manager to input a selection command through a direct input instruction. As mentioned above, the input unit 122 is not limited to those mentioned above, and inputting of function selection can be implemented in various ways.

In accordance with a safety signal from the monitoring unit 112, the control unit 114 interrupts a gas supply and sends a report to the monitoring center 200. When a gas supply is interrupted, the cutoff valve 104 is activated, to thus cut off the passageway 102. When a report is sent, a command is sent to the communication unit 124, to thus establish a communication with the monitoring center 200 by way of the communication line 300 and report occurrence of malfunction about an unset function to the monitoring center 200. The communication unit 124 sends a report by a method for originating a call by use of a telephone line as the communication line 300, and the like. At this time, when detected an event fulfilling operating conditions for the safety function (the set function) set by the function setting unit 116 by means of first monitoring operation of the monitoring unit 112, the control unit 114 cuts off a gas supply. When an event fulfilling operating conditions for safety function (unset function) not set by the function setting unit 116 is detected through the second monitoring operation of the monitoring unit 112, an alarm is issued to the monitoring center 200. Sending a report to the monitoring center 200 is carried out when occurrence of malfunction is determined a predetermined number of times by means of second monitoring operation. The accuracy of detection of malfunction incidental to a gas supply is thereby enhanced and taken as data used for appealing additional necessity of safety function to the user.

When received from the gas meter 100 a report about malfunction detected through the second monitoring operation, the monitoring center 200 reports the malfunction detected by means of currently-unselected safety function to the user, thereby prompting the user to set the safety function. Various reporting means as well as reporting effected by way of the communication line 300 can be used for sending a report to the user. An attempt is thereby made to enhance safety function. The monitoring center 200 may transmit a setting command to the gas meter 100 by way of the communication line 300, thereby setting unset safety function for which the event has been detected.

Integration processing commensurate with various flow conditions is available as measurement function, and the following functions, for instance, are available. Results of flow measurement can be utilized for a discount, or the like.

(1) Normal integration function . . . A measured flow value is integrated.
(2) Time-of-day integration function . . . A flow is integrated according to a predetermined time period, and a result of integration is utilized for a discount and an extra charge.
(3) Seasonal integration function . . . A flow is integrated according to a predetermined season (monthly), and a result of integration is utilized for a discount or an extra charge.
(4) Appliance-specific integration function . . . A flow is integrated on a per-appliance basis, and a result of integration is utilized for a discount and an extra charge.
(5) Function-specific integration function . . . A flow is integrated according to a usage pattern (heating, a hot water supply, cooking, and the like), and a result of integration is utilized for a discount and an extra charge.

When integration is performed according to a time period and a season, a timer and a calendar function are required. Integration that is to be performed on a per-appliance basis or a per-function basis is based on a premise of use of a meter having appliance determination function and usage pattern determination function.

When the user does not particularly select a function, normal integration function is set as; for instance, a default measurement function. When a function is selected, a selected measurement function as well as the normal integration function becomes effective.

In relation to the safety function, there is available a function of performing processing for safety purposes by detecting various malfunction events attributable to an excess flow, an excess in operating time, detection of leakage, anomalous pressure, detection of pulsation, operation of a seismoscope, operation of an alarm, and the like. There are the following functions in relation to; for instance, detection of malfunction.

(1) Excess in total maximum flow . . . arising when the total flow achieved in a given period exceeds a reference flow.

(2) Excess in individual maximum flow . . . arising when a difference between a current flow and a previous flow is equal to or greater than a predetermined value every time a flow is measured.
(3) Excess of a duration of safety . . . arising when an appliance is continually used in excess of an allowable continual operating time specified for each flow.
(4) Detection of pressure rise . . . arising when an increase in a pressure level to a predetermined level or more is detected.
(5) Detection of pressure drop . . . arising when a decrease in pressure level to a predetermined level or below is detected.
(6) Detection of operation of a seismoscope . . . arising when activation of a seismoscope resultant from a tremor of an earthquake, or the like, is detected.
(7) Detection of minute leakage . . . arising when a predetermined quantity of a minute leakage of flow has been detected for a predetermined number of days.
(8) Detection of pulsation . . . arising when a flow fluctuation or a pressure fluctuation of predetermined level or more is detected.
(9) Detection of operation of an alarm . . . arising when activation of various alarms is detected.

When the user does not particularly select any function, safety function for an excess in total maximum flow is set as; for instance, a default safety function. When the safety function is selected, the thus-selected safety function becomes effective. As mentioned previously, an alarm operation and a cutoff operation are provided as processing operations performed when malfunction is detected by the safety function. When an anomaly is detected by the selected set function, cutoff operation is performed. When an anomaly is detected by unselected, unset function, alarm operation is performed.

Figure 2:
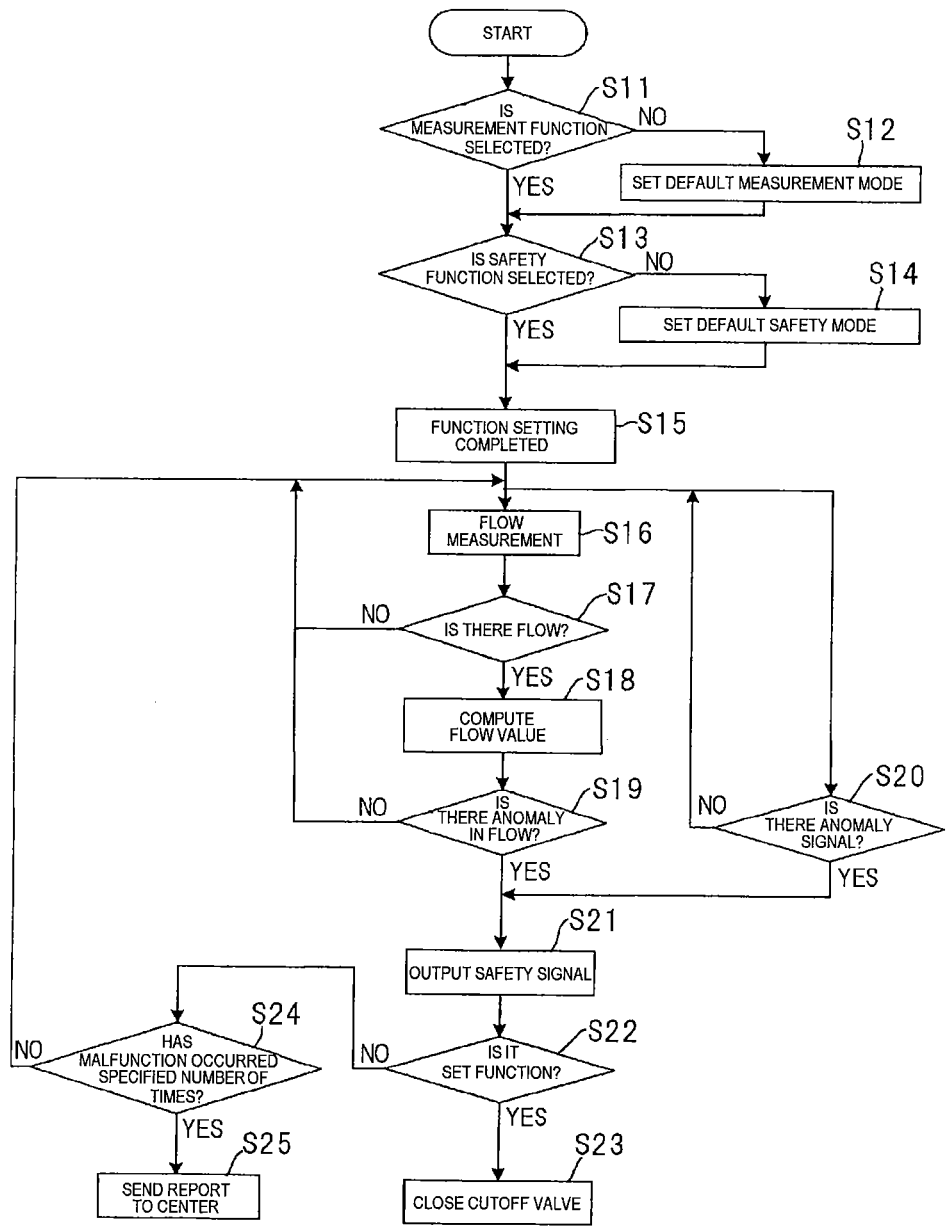
FIG. 2 is a flowchart showing processing procedures employed at the time of operation of the gas meter and the gas safety system of the embodiment of the present invention

Operation of the gas meter and the gas safety system of the embodiment will now be described in detail. FIG. 2 is a flowchart showing processing procedures employed at the time of operation of the gas meter and the gas safety system of the embodiment of the present invention.

The function setting unit 116 first determines as function setting processing whether or not measurement function is selected (step S11). When measurement function is selected, selected measurement function is set in step S11, and processing proceeds to the next processing. In contrast, when measurement function is not selected, a setting is made to a default measurement mode (e.g., only normal integration function) (step S12), and processing proceeds to the next processing. Subsequently, the function setting unit 116 determines whether or not safety function is selected (step S13). In step S13, when safety function is selected, selected safety function is set, and processing proceeds to the next processing. In contrast, when safety function is not selected, a default safety mode (e.g., only a mode for an excess in total maximum flow) is set (step S14), and processing proceeds to the next processing. Measurement function and safety function are set, whereby function setting is completed (step S15).

The flow measurement unit 106 next measures a gas flow (step S16). A determination is made as to whether or not a flow has been detected (step S17). When a flow has been detected, the flow computing unit 110 computes a flow value (step S18). During computation of a flow value, various flow values set as measurement function are integrated. When a flow is not detected in step S17, processing returns to flow measurement pertaining to step S16, where similar processing is repeated. After computation of the flow value, the monitoring unit 112 determines whether or not an anomaly, such as an excess flow, exists in a flow (step S19). In step S19, when an anomaly exists in a flow, processing proceeds to the next processing. When an anomaly is not present, processing returns to flow measurement pertaining to step S16, where similar processing is repeated. The monitoring unit 112 determines whether or not an anomaly signal, such as a pressure detection signal from the pressure sensor 108, a seismic signal from the seismoscope 126, and an anomaly detection signal from the alarm 128, is output (step S20). In step S20, when an anomaly signal is output, processing proceeds to the next processing. In contrast, when an anomaly signal is not output, processing returns to flow measurement pertaining to step S16, where similar processing is iterated.

When an anomaly is present in a flow or when an anomaly signal is output, the monitoring unit 112 determines occurrence of a fault and outputs a safety signal to the control unit 114 (step S21). In step S21, when outputting a safety signal upon detection of malfunction, the monitoring unit 112 determines operating conditions as to unselected, unset safety functions as well as to the safety function of the selected, set function. When operating conditions are fulfilled, a safety signal pertaining to the corresponding safety function and information about setting/unsetting of function are passed to the control unit 114. The control unit 114 determines whether or not the safety function for which the safety signal has been output is the set safety function (step S22). In step S22, when the safety function is determined to be the set safety function, the cutoff valve 104 is activated, to thus close the passageway 102 and cut off the gas supply (step S23).

Meanwhile, in step S22, when the safety function is determined to be unset safety function, the control unit 114 determines whether or not malfunction related to the safety function has occurred a specified number of times (step S24). When malfunction has not arisen a specified number of times in step S24, processing returns to flow measurement pertaining to step S16, where similar processing is repeated. When malfunction has arisen a specified number of times in step S24, the control unit 114 sends an alarm by way of the communication unit 124, thereby sending an alarm to the monitoring center 200 by way of the communication line 300 (step S25). As a result, even when malfunction is detected in connection with safety function not selected by the user as a result of operating conditions having been fulfilled a predetermined number of times, the monitoring center 200 can ascertain occurrence of malfunction. When received the report about occurrence of malfunction from the gas meter 100, the monitoring center 200 informs the user of occurrence of malfunction related to unselected safety function, whereby a necessity for setting the corresponding safety function is reported, to thus enhance safety function.

According to the foregoing embodiment, safety function can be selected and set, as appropriate, according to a use environment. When an event corresponding to the set function has arisen, safety processing for cutting off a gas supply can be carried out. An event related to unset function is reported to the monitoring center, whereby the monitoring center can ascertain occurrence of malfunction related to unset function. In this case, for instance, the user is prompted to set corresponding safety function, so that safety function can be enhanced.

A safety function can be selected from among a plurality of safety functions in accordance with a district where a gas meter is used, a location where a gas meter is installed, an operating state, the quantity of flow consumed, and the like, and the thus-selected safety function can be set. Updating of the safety function in compliance with a version upgrade or addition of new safety function is also possible.

Even when substantially all of the safety functions are set on the gas meter, when the risk of occurrence of an accident attributable to a gas supply is considerably low, and when safety is assured, an accident happens on rare occasion. In such a case, upgrading of the gas meter can also be made possible while advanced safety function for preventing occurrence of a rare accident is taken as an option.

Depending on a district where the gas meter is used, an area where no safety functions are available is also conceived. In such a district, a desire for beefing up safety functions may arise in accordance with future development of infrastructures, an emotional change in the user who places emphasis on safety, and changes in measures of the government, and the like. It is also possible to enable, as an initial response to the desire, selective setting of a safety function for preventing occurrence of an accident, which would otherwise be caused by a gas supply, and enhance safety of the gas supply system by charging a safety function and attempting expansion of the functions of the existing gas meter.

The present invention is not limited to the contrivances described in connection with the embodiment and is also scheduled to undergo alterations or applications, which will be envisaged by those skilled artisans on the basis of the descriptions of the present patent specification and the known techniques. The alterations and applications shall also fall within a scope for which protection is sought.

The present patent application is based on Japanese Patent Application (No. 2008-057351) filed on Mar. 7, 2008 in Japan, contents of which are incorporated herein by reference.

Industrial Applicability

Safety functions can be set, as appropriate, according to a use environment; hence, the present invention yields an advantage of the ability to enhance safety function, and the present invention is useful for a gas meter that measures the quantity of gas consumed, a gas safety system including the gas meter, and the like.

The invention claimed is:

1. A gas meter comprising:
a flow measurement unit that measures a gas flow flowing through a gas flow passage;
a flow computing unit that computes predetermined flow data in accordance with a flow value measured by the flow measurement unit;
a function setting unit configured to set at least one safety function from among a plurality of safety functions pertaining to usage of a gas;
a monitoring unit that detects, based on the flow value, occurrence of a malfunction arising during usage of a gas;
a control unit that determines, when the monitoring unit detects a malfunction, whether the detected malfunction corresponds to one of the at least one safety function set by the function setting unit; and
a communication unit that establishes a communication with the monitoring center that monitors a gas supply in accordance with a command from the control unit, wherein the control unit further;
interrupts a gas supply when the detected malfunction corresponds to one of the at least one safety function set by the function setting unit; and
when the detected malfunction does not correspond to one of the at least one safety function set by the function setting unit, sends a report of the occurrence of the detected malfunction to the monitoring center by means of the communication unit.

2. The gas meter according to claim 1, wherein, when the detected malfunction does not correspond to one of the at least one safety function set by the function setting unit, the control unit;
determines a number of times the detected malfunction has occurred; and
when the detected malfunction has occurred a predetermined number of times, sends the report to the monitoring center of the occurrence of the detected malfunction.

3. The gas meter according to claim 1, wherein the function setting unit is configured to set, as one of the at least one safety function, at least any of functions for detecting malfunction due to events comprising an excess flow, an excess in operating time, detection of leakage, anomalous pressure, detection of pulsation, operation of a seismoscope, and operation of an alarm.

4. A gas safety system comprising:
the gas meter defined in claim 1; and
a monitoring center that is connected to the gas meter by way of a communication line and that receives a report from the gas meter.

* * * * *